United States Patent
Tsan (10) Patent No.: US 8,457,308 B2
(45) Date of Patent: Jun. 4, 2013

(54) COMMUNICATION SYSTEM AND METHOD FOR PROTECTING MESSAGES BETWEEN TWO MOBILE PHONES

(75) Inventor: Chih-Lung Tsan, Tu-Cheng (TW)

(73) Assignee: Chi Mei Communications Systems, Inc., New Taipei (TW)

( * ) Notice: Subject to any disclaimer, the term of this patent is extended or adjusted under 35 U.S.C. 154(b) by 1010 days.

(21) Appl. No.: 12/483,234

(22) Filed: Jun. 11, 2009

(65) Prior Publication Data

US 2010/0054463 A1   Mar. 4, 2010

(30) Foreign Application Priority Data

Aug. 29, 2008   (CN) .......................... 2008 1 0304316

(51) Int. Cl.
*H04L 9/00* (2006.01)
*H04W 4/00* (2009.01)
(52) U.S. Cl.
USPC ............................................ 380/44; 455/466
(58) Field of Classification Search
None
See application file for complete search history.

(56) References Cited

U.S. PATENT DOCUMENTS

| | | | | |
|---|---|---|---|---|
| 5,915,021 A * | 6/1999 | Herlin et al. | ................... | 705/67 |
| 6,317,831 B1 * | 11/2001 | King | ............................. | 713/171 |
| 7,284,127 B2 * | 10/2007 | Gehrmann | .................... | 713/169 |
| 7,725,723 B2 * | 5/2010 | Landrock et al. | ............. | 713/176 |
| 7,991,158 B2 * | 8/2011 | Narendra et al. | ............. | 380/260 |
| 2006/0262929 A1 * | 11/2006 | Vatanen et al. | ............... | 380/255 |
| 2009/0054038 A1 * | 2/2009 | Ranjan et al. | ............... | 455/412.1 |
| 2009/0150671 A1 * | 6/2009 | Abe | ............................. | 713/169 |

* cited by examiner

*Primary Examiner* — Azizul Choudhury
(74) *Attorney, Agent, or Firm* — Atlis Law Group, Inc.

(57) ABSTRACT

A communication system and method for protecting messages between two mobile phones are provided. The method sets protective parameters in a first mobile phone, generates an encryption key and a decryption key according to the protective parameters, stores the decryption key into a storage device of the first mobile phone, and registers the encryption key to a second mobile phone through a wireless network. The method further encrypts a short message into an encrypted message in the second mobile phone according to the encryption key, and sends the encrypted message to the first mobile phone through the wireless network. In addition, the method decrypts the encrypted message to a readable message when the first mobile phone receives the encrypted message, and displays the readable message on a display screen of the first mobile phone.

15 Claims, 6 Drawing Sheets

COMMUNICATION SYSTEM AND METHOD FOR PROTECTING MESSAGES BETWEEN TWO MOBILE PHONES

BACKGROUND

1. Technical Field

Embodiments of the present disclosure relate systems and methods for providing short message services of mobile devices, and more particularly to a communication system and method for protecting messages between two mobile phones.

2. Description of Related Art

Short message services is a service commonly used in wireless networks which makes it possible for mobile users to send and receive short messages (e.g., text, image, audio and/or video messages). These messages may be related to personal and private, or business secrets, so these messages should not be viewed by other persons who have no authorization. However, when a mobile device (e.g., mobile phone) receives a short message sent from another mobile phone, any person can easily operate the mobile phone to view content of the short message.

In order to protect messages from reviewing with no authorization, the mobile phone usually requires the user to input a password when the secret messages are viewed. However, such protection means has a disadvantage that one person can also view the short messages if the password is betrayed.

Therefore, there is a communication system and method for protecting messages between two mobile phones, so as to overcome the above-mentioned disadvantages.

DETAILED DESCRIPTION

Figure 1:
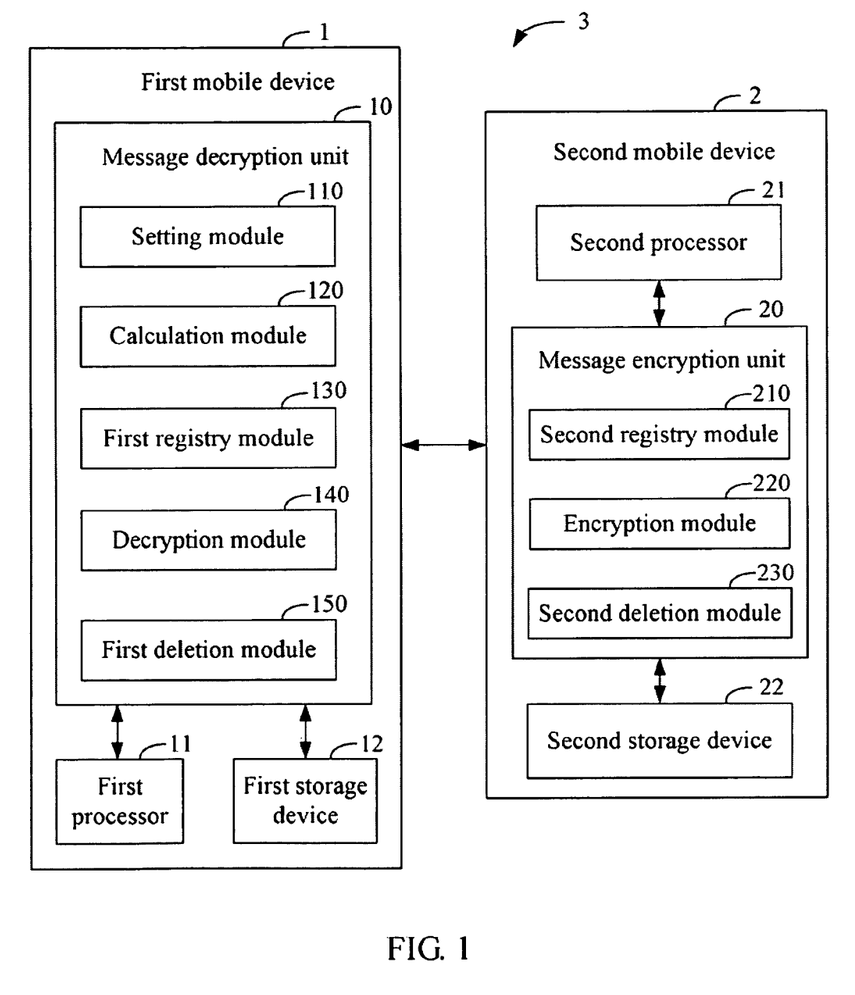
FIG. 1 is a schematic diagram of one embodiment of a communication system for protecting messages between two mobile phones.

FIG. 1 is a schematic diagram of one embodiment of a communication system 3 for protecting messages between two mobile phones. In one embodiment, the communication system 3 may include a first mobile phone 1 and a second mobile phone 2. The first mobile phone 1 includes a message decryption unit 10, which is operable to decrypt a plurality of encrypted messages transmitted from the second mobile phone 2. The first mobile phone 1 may include a first processor 11 that executes computerized codes for the message decryption unit 10, and may further include a first storage device 12. In one embodiment, the message decryption unit 10 is included in the first storage device 12 or another readable medium of the first mobile phone 1. In another embodiment, the message decryption unit 10 may be included in an operating system of the first mobile phone 1.

The second mobile phone 2 includes a message encryption unit 20, which is operable to encrypt a plurality of short messages to be sent to the first mobile phone 1. The second mobile phone 2 may include a second processor 21 that executes computerized codes for the message encryption unit 20, and may further include a second storage device 22. In one embodiment, the message encryption unit 20 is included in the second storage device 22 or another readable medium of the second mobile phone 2. In another embodiment, the message encryption unit 20 may be included in an operating system of the second mobile phone 2.

The first storage device 12 stores a plurality of short messages received by the first mobile phone 1, and the second storage device 22 stores a plurality of short messages received by the second mobile phone 2. In one embodiment, either the first storage device 12 or the second storage device 22 may be a smart media card, a secure digital card, a compact flash card, a multi media card, or extreme digital card, and so on.

In one embodiment, the message decryption unit 10 may include a setting module 110, a calculation module 120, a first registry module 130, a decryption module 140, and a first deletion module 150. The message encryption unit 20 may include a second registry module 210, an encryption module 220, and a second deletion module 230. Each of the function modules 100-150 can be executed by the first processor 11, and each of the function modules 210-230 can be executed by the second processor 21.

The setting module 110 is operable to set a plurality of protective parameters in the first mobile phone 1. In one embodiment, the protective parameters may include a predefined password and a message security level. The message security level may be a first security level, a second security level, and a third security level, for example. Each security level is used to identify an importance of a short message. In order to identify the importance of a short message, a corresponding security level may be included in the short message when the short message is sent to the first mobile phone 1.

The calculation module 120 is operable to generate an encryption key and a decryption key according to the plurality of protective parameters, and store the decryption key into the first storage device 12 of the first mobile phone 1.

The first registry module 130 is operable to register the encryption key to the second mobile phone 2 through a wireless network, such as a global system for mobile communications (GSM) network, or a general packet radio service (GPRS) network. In detail, the first registry module 130 generates a registry request for registering the encryption key to the second mobile phone 2 when the encryption key is generated, and sends the registry request to the second mobile phone 2 through the wireless network. The second registry module 210 stores the encryption key into the second storage device 22 when the second mobile phone 2 accepts the registry request.

The encryption module 220 is operable to encrypt a short message into an encrypted message according to the encryption key, and send the encrypted message to the first mobile phone 1 through the wireless network. The encryption module 220 is further operable to generate an encryption tag for indentifying whether a short message is an encrypted message, and pack the encryption tag into the encrypted message.

The decryption module 140 is operable to decrypt the encrypted message to a readable message when the first mobile phone 1 receives the encrypted message, and display the readable message on a display screen of the first mobile phone 1. In detail, the decryption module 140 determines whether a short message received by the first mobile phone 1 is an encrypted message according to the encryption tag of the short message. If the short message is an encrypted message, the decryption module 140 obtains the decryption key from the first storage device 12 according to the message security level of the encrypted message, and decrypts the encrypted message to the readable message according to the decryption key.

The first deletion module 150 is operable to delete the decryption key from the first mobile phone 1, and the first deletion module 230 is operable to delete the encryption key from the second mobile phone 2. In detail, the first deletion module 150 deletes the decryption key from the first storage device 12 when the user inputs a deletion command from the first mobile phone 1. The first deletion module 150 generates a deletion request according to the deletion command, and sends the deletion request to the second mobile phone 2 through the wireless network. Then the second deletion module 230 deletes the encryption key from the second storage device 22 when the second mobile phone 2 receives the deletion request from the first mobile phone 1.

Figure 2:
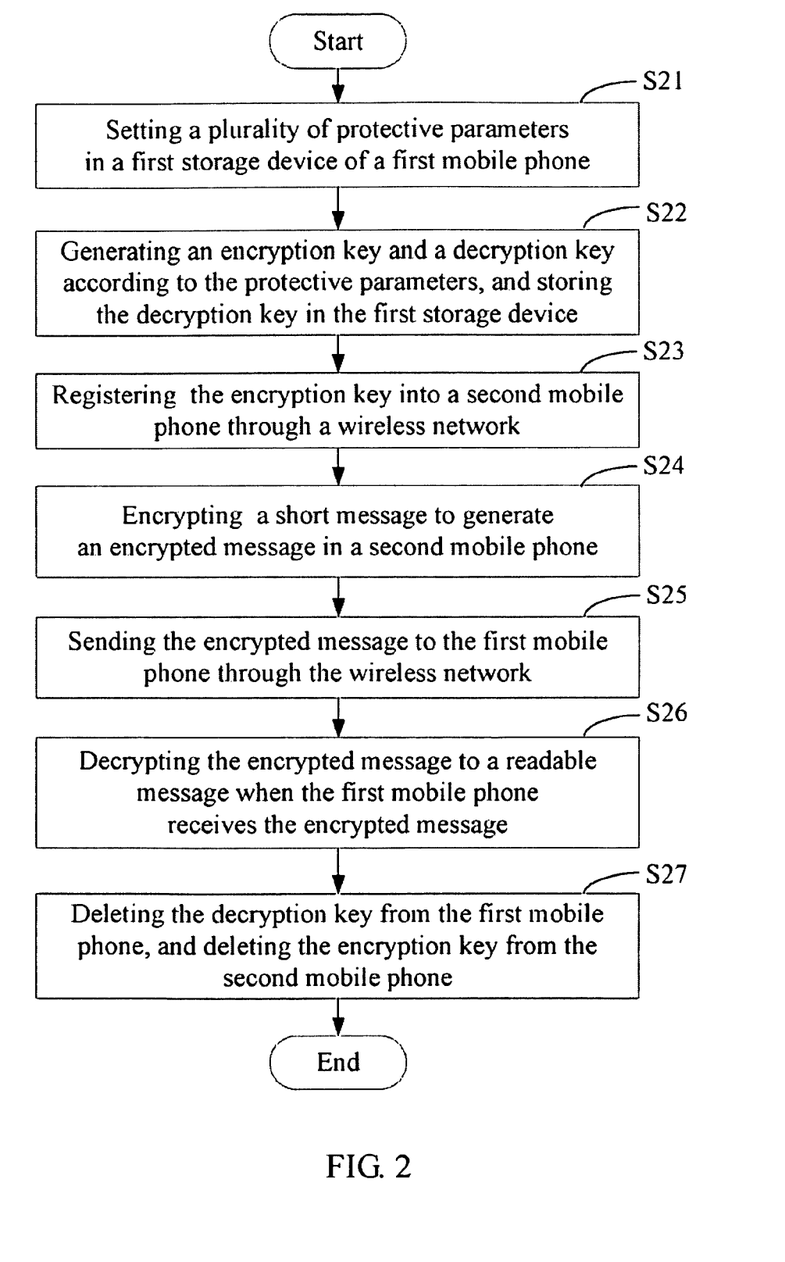
FIG. 2 is a flowchart of one embodiment of a method for protecting messages between two mobile phones by using the communication system of FIG. 1.

FIG. 2 is a flowchart of one embodiment of a method for protecting messages between two mobile phones by using the communication system 3 of FIG. 1 as described above. Depending on the embodiment, additional blocks may be added, others removed, and the ordering of the blocks may be changed.

In block S21, the setting module 110 sets a plurality of protective parameters in the first mobile phone 1. In one embodiment, the protective parameters may include a predefined password and a message security level. As mentioned above, the message security level may be a first security level, a second security level, and a third security level. Each security level is used to identify an importance of a short message. In order to identify the importance of a short message, a corresponding security level may be included in the short message when the short message is sent to the first mobile phone 1.

In block S22, the calculation module 120 generates an encryption key and a decryption key according to the plurality of protective parameters, and stores the decryption key into the first storage device 12 of the first mobile phone 1. In block S23, the first registry module 130 registers the encryption key to the second mobile phone 2 through a wireless network, such as GSM network, or a GPRS network. Details of registering the encryption key to the second mobile phone 2 are described as FIG. 3 below.

In block S24, the encryption module 220 encrypts a short message to generate an encrypted message in the second mobile phone 2 according to the encryption key. Details of encrypting the short message are described as FIG. 4 below.

In block S25, the encryption module 220 sends the encrypted message to the first mobile phone 1 through the wireless network. In block S26, the decryption module 140 decrypts the encrypted message to a readable message when the first mobile phone 1 receives the encrypted message. Details of decrypting the encrypted message are described as FIG. 5.

In block S27, the first deletion module 150 deletes the decryption key from the first mobile phone 1, and the second deletion module 230 deletes the encryption key from the second mobile phone 2. Details of deleting the two keys are described as FIG. 6 below.

Figure 3:
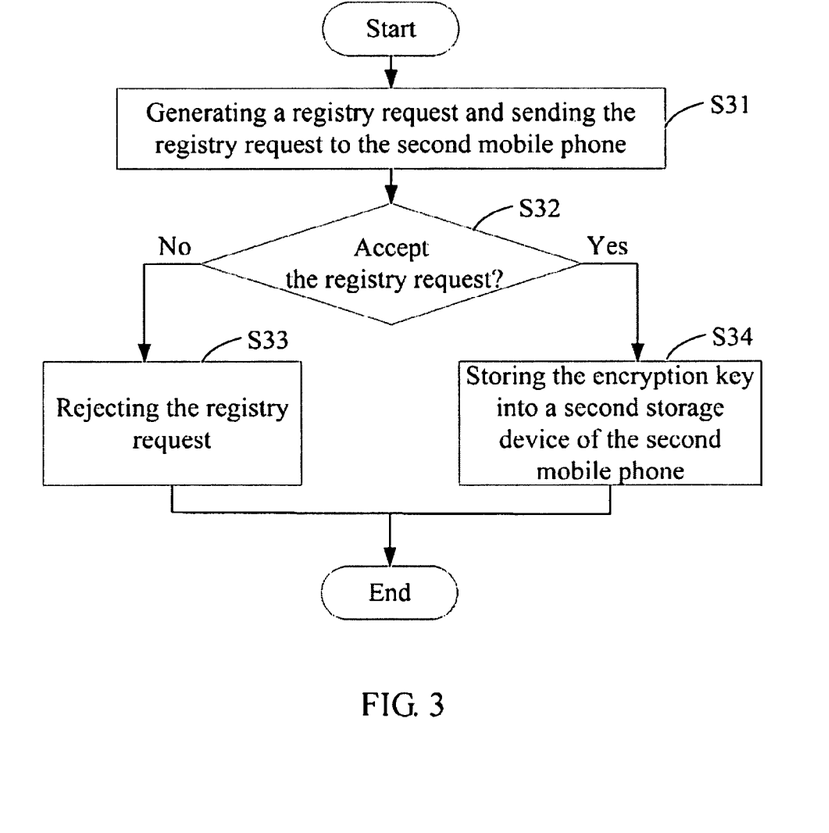
FIG. 3 is a flowchart of detailed descriptions of S23 in FIG. 2.

FIG. 3 is a flowchart of detailed descriptions of S23 in FIG. 2. In block S31, the first registry module 130 generates a registry request when the encryption key is generated by the calculation module 120, and sends the registry request to the second mobile phone 2 through the wireless network. In block S32, the second registry module 210 determines whether the second mobile phone 2 accepts the registry request. If the second mobile phone 2 does not accept the registry request, in block S33, the second registry module 210 rejects the registry request from the first mobile phone 1. Otherwise, if the second mobile phone 2 accepts the registry request, in block S34, the second registry module 210 stores the encryption key into the second storage device 22 of the second mobile phone 2.

Figure 4:
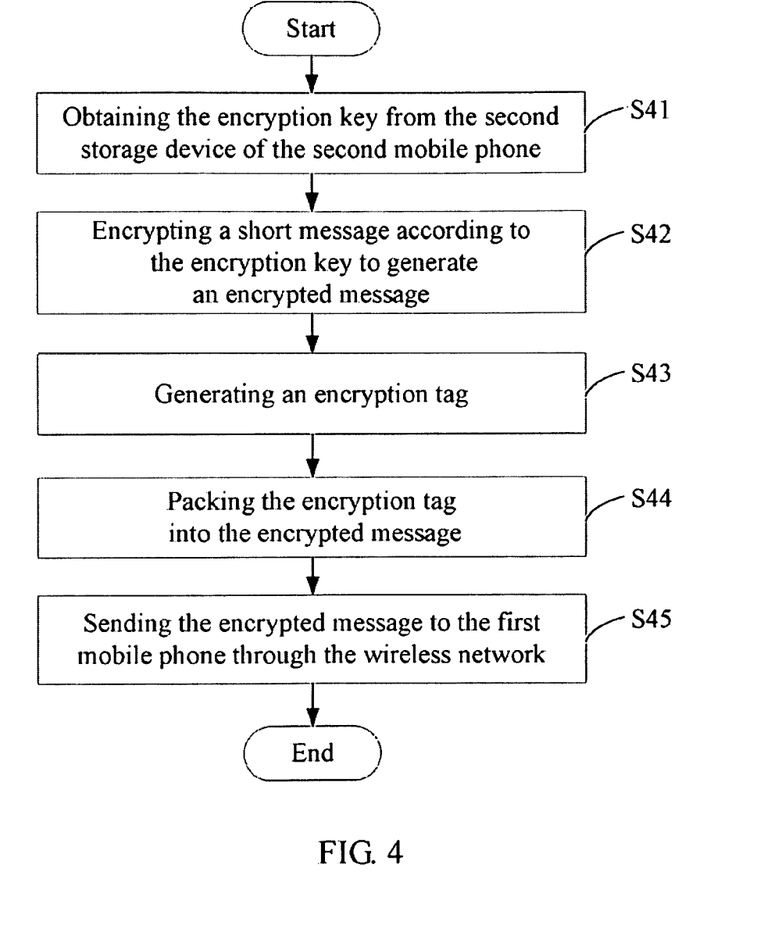
FIG. 4 is a flowchart of detailed descriptions of S24 in FIG. 2.

FIG. 4 is a flowchart of detailed descriptions of S24 in FIG. 2. In block S41, the encryption module 220 obtains an encryption key from the second device 22 of the second mobile phone 2. In block S42, the encryption module 220 encrypts a short message according to the encryption key, thereby generating the encrypted message. In block S43, the encryption module 220 generates an encryption tag for indentifying whether a short message to be sent the first mobile phone 1 is an encrypted message. In block S44, the encryption module 220 packs the encryption tag into the encrypted message. In block S45, the encryption module 220 sends the encrypted message to the first mobile phone 1 through the wireless network.

Figure 5:
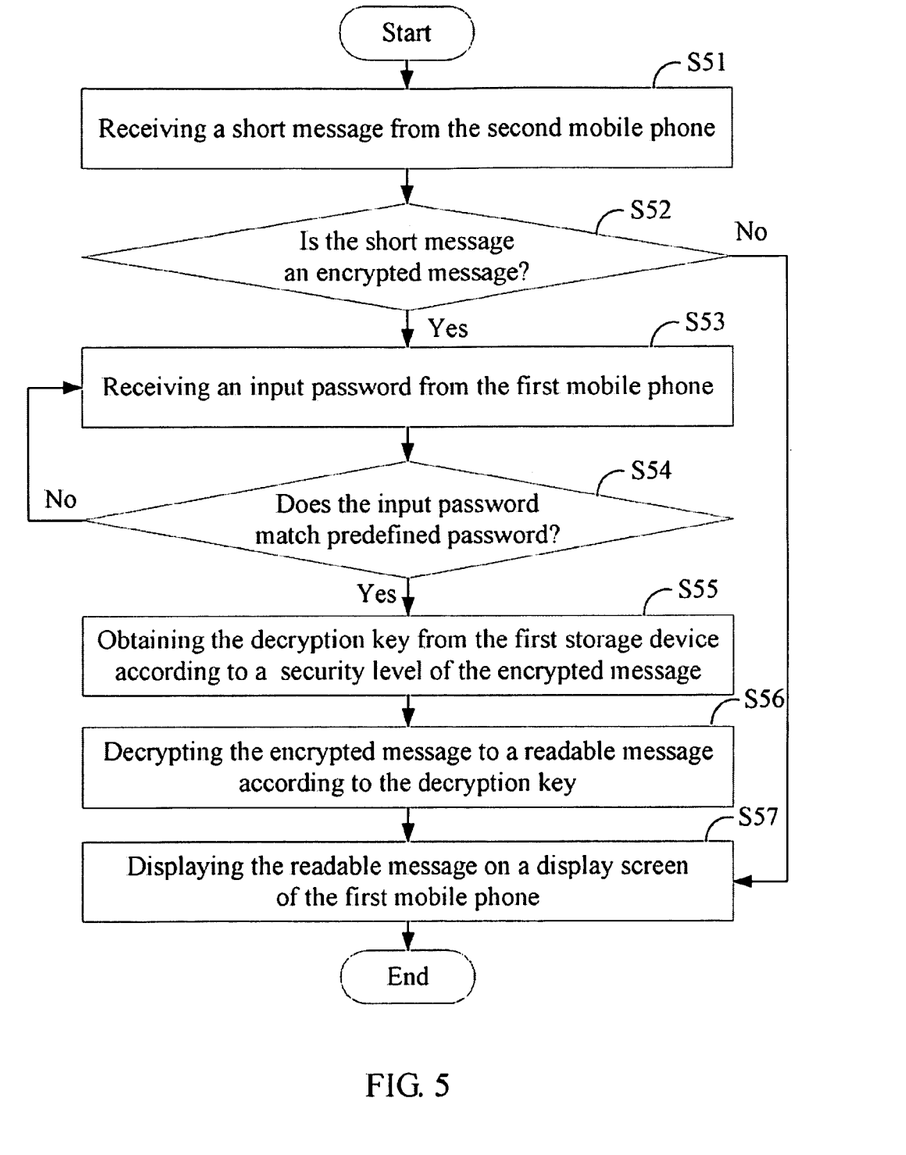
FIG. 5 is a flowchart of detailed descriptions of S26 in FIG. 2.

FIG. 5 is a flowchart of detailed descriptions of S26 in FIG. 2. In block S51, the first mobile phone 1 receives a short message from the second mobile phone 2. In block S52, the decryption module 140 determines whether the short message is an encrypted message according to the encryption tag of the short message. If the short message is not an encrypted message, the procedure directly goes to block S57 as described below. Otherwise, if the short message is an encrypted message, in block S53, the decryption module 140 receives an input password from the first mobile phone 1. In block S54, the decryption module 140 determines whether the input password matches the predefined password set by the setting module 110. If the input password does not match the predefined password, the procedure returns to block S53 as described above. Otherwise, if the input password matches the predefined password, in block S55, the decryption module 140 obtains the decryption key from the first storage device 12 according to the message security level of the encrypted message. In block S56, the decryption module 140 decrypts the encrypted message to the readable message according to the decryption key. In block S57, the decryption module 140 displays the readable message on a display screen of the first mobile phone 1.

Figure 6:
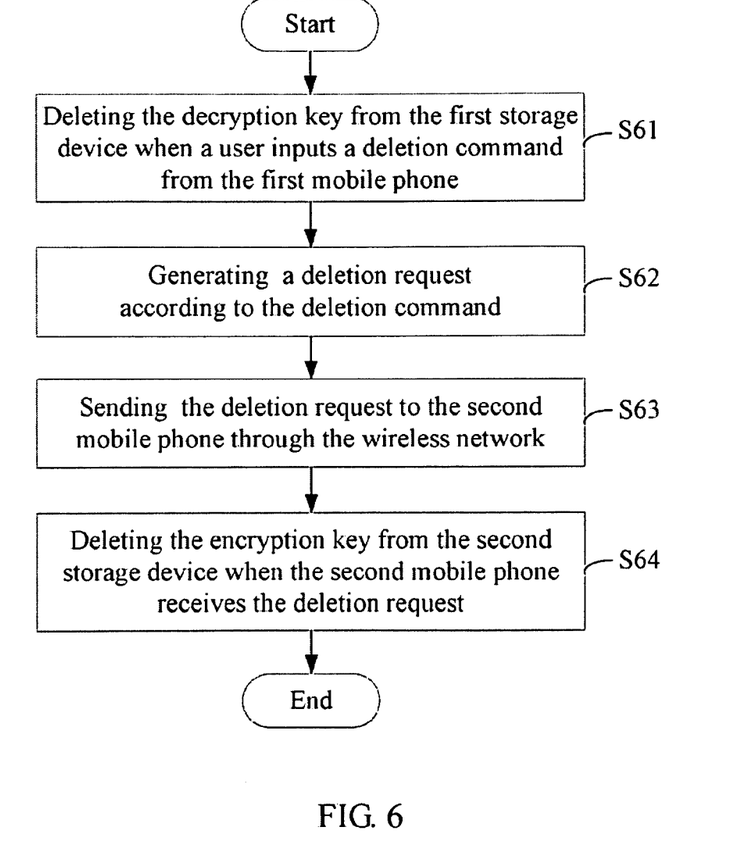
FIG. 6 is a flowchart of detailed descriptions of S27 in FIG. 2

FIG. 6 is a flowchart of detailed descriptions of S27 in FIG. 2. In block S61, the first deletion module 150 deletes the decryption key from the first storage device 12 when the user inputs a deletion command from the first mobile phone 1. In block S62, the first deletion module 150 generates a deletion request according to the deletion command. In block S63, the first deletion module 150 sends the deletion request to the second mobile phone 2 through the wireless network. In block S64, the second deletion module 230 deletes the encryption key from the second storage device 22 when the second mobile phone 2 receives the deletion request from the first mobile phone 1.

All of the processes described above may be embodied in, and fully automated via, functional code modules executed by one or more general purpose processors of mobile devices having short message services. The functional code modules may be stored in any type of readable medium or other storage storages. Some or all of the methods may alternatively be embodied in specialized the mobile devices.

Although certain inventive embodiments of the present disclosure have been specifically described, the present disclosure is not to be construed as being limited thereto. Various changes or modifications may be made to the present disclosure without departing from the scope and spirit of the present disclosure.

What is claimed is:

1. A communication system for protecting messages between two mobile phones, the communication system comprising:
   a first mobile phone and a second mobile phone, the first mobile phone comprising:
   a storage device that stores messages received by the first mobile phone; and
   at least one processor that executes a message decryption unit, the message decryption unit comprising:
   a setting module that sets a plurality of protective parameters in the storage device, the protective parameters comprising a message security level of a short message that identifies an importance of the short message;
   a calculation module that generates an encryption key and a decryption key according to the plurality of protective parameters, and stores the decryption key into the storage device;
   a registry module that registers the encryption key to the second mobile phone through a wireless network; and
   a decryption module that determines whether a short message received from the second mobile phone is an encrypted message according to an encryption tag of the short message, obtains the decryption key from the storage device according to the message security level of the short message if the short message is the encrypted message, decrypts the encrypted message to a readable message according to the decryption key, and displays the readable message on a display screen of the first mobile phone.

2. The communication system according to claim 1, wherein the second mobile phone comprises an encryption module that encrypts a short message into the encrypted message according to the encryption key, and sends the encrypted message to the first mobile phone through the wireless network.

3. The communication system according to claim 2, wherein the encryption module further generates an encryption tag for the encrypted message, and pack the encryption tag into the encrypted message.

4. The communication system according to claim 1, wherein the message decryption unit further comprises a first deletion module that deletes the decryption key from the first mobile phone when a deletion command is received.

5. The communication system according to claim 4, wherein the second mobile phone comprises a second deletion module that deletes the encryption key from the second mobile phone when the deletion command is received from the first mobile phone.

6. A communication method for protecting messages between a first mobile phone and a second mobile phone, the communication method comprising:
   (a) setting a plurality of protective parameters in the first mobile phone, the protective parameters comprising a message security level of a short message that identifies an importance of the short message;
   (b) generating an encryption key and a decryption key according to the protective parameters, and storing the decryption key into a storage device of the first mobile phone;
   (c) registering the encryption key to the second mobile phone through a wireless network;
   (d) encrypting a short message into an encrypted message in the second mobile phone according to the encryption key;
   (e) sending the encrypted message to the first mobile phone through the wireless network;
   (f) determining whether a short message received by the first mobile phone is the encrypted message according to an encryption tag of the short message, obtaining the decryption key from the storage device according to the message security level of the short message if the short message is the encrypted message, and decrypting the encrypted message to a readable message; and
   (g) displaying the readable message on a display screen of the first mobile phone.

7. The communication method according to claim 6, further comprising:
   deleting the decryption key from the first mobile phone when a deletion command is received; and
   deleting the encryption key from the second mobile phone when the second mobile phone receives the deletion command from the first mobile phone.

8. The communication method according to claim 6, wherein the block (c) comprises:
   generating a registry request when the encryption key is generated;
   sending the registry request to the second mobile phone through the wireless network;
   determining whether the second mobile phone accepts the registry request;
   rejecting the registry request from the first mobile phone if the second mobile phone does not accept the registry request; and
   storing the encryption key into the second mobile phone if the second mobile phone accepts the registry request.

9. The communication method according to claim 6, wherein the block (d) comprises:
   obtaining the encryption key from the second mobile phone;
   encrypting the short message according to the encryption key to generate the encrypted message; and
   generating an encryption tag for the encrypted message, and packing the encryption tag into the encrypted message.

10. The communication method according to claim 6, wherein the block (f) comprises:
    receiving a short message from the second mobile phone;
    displaying the short message on the display screen of the first mobile phone if the short message is not the encrypted message;
    receiving an input password from a user interface of the first mobile phone if the short message is the encrypted message;
    determining whether the input password matches a predefined password; and
    decrypting the encrypted message to the readable message according to the decryption key if the input password matches the predefined password.

11. A non-transitory computer readable storage medium having stored thereon instructions that, when executed by a first mobile phone and a second mobile phone, cause the two mobile phones to perform a method for protecting messages between the two mobile phones, wherein the method comprises:
    (a) setting a plurality of protective parameters in the first mobile phone, the protective parameters comprising a message security level of a short message that identifies an importance of the short message;

(b) generating an encryption key and a decryption key according to the protective parameters, and storing the decryption key into a storage device of the first mobile phone;

(c) registering the encryption key to the second mobile phone through a wireless network;

(d) encrypting a short message into an encrypted message in the second mobile phone according to the encryption key;

(e) sending the encrypted message to the first mobile phone through the wireless network;

(f) determining whether a short message received by the first mobile phone is the encrypted message according to an encryption tag of the short message, obtaining the decryption key from the storage device according to the message security level of the short message if the short message is the encrypted message, and decrypting the encrypted message to a readable message; and (g) displaying the readable message on a display screen of the first mobile phone.

12. The non-transitory computer readable storage medium according to claim 11, wherein the method further comprises:

deleting the decryption key from the first mobile phone when a deletion command is received; and deleting the encryption key from the second mobile phone when the second mobile phone receives the deletion command from the first mobile phone.

13. The non-transitory computer readable storage medium according to claim 11, wherein the block (c) comprises:

generating a registry request when the encryption key is generated;

sending the registry request to the second mobile phone through the wireless network;

determining whether the second mobile phone accepts the registry request;

rejecting the registry request from the first mobile phone if the second mobile phone does not accept the registry request; and storing the encryption key into the second mobile phone if the second mobile phone accepts the registry request.

14. The non-transitory computer readable storage medium according to claim 11, wherein the block (d) comprises:

obtaining the encryption key from the second mobile phone;

encrypting the short message according to the encryption key to generate the encrypted message; and generating an encryption tag for the encrypted message, and packing the encryption tag into the encrypted message.

15. The non-transitory computer readable storage medium according to claim 11, wherein the block (f) comprises:

receiving the short message from the second mobile phone;

displaying the short message on the display screen of the first mobile phone if the short message is not the encrypted message;

receiving an input password from a user interface of the first mobile phone if the short message is the encrypted message;

determining whether the input password matches a predefined password; and decrypting the encrypted message to the readable message according to the decryption key if the input password matches the predefined password.

* * * * *